(12) United States Patent
Wang et al.

(10) Patent No.: US 8,959,258 B2
(45) Date of Patent: Feb. 17, 2015

(54) DETECTION SYSTEM FOR DETECTING BUTTON BEING PRESSED AND METHOD THEREOF

(71) Applicants: Hong Fu Jin Precision Industry (ShenZhen) Co., Ltd., Shenzhen (CN); Hon Hai Precision Industry Co., Ltd., New Taipei (TW)

(72) Inventors: Ya-Guo Wang, Shenzhen (CN); Chun-Ching Chen, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/243,057

(22) Filed: Apr. 2, 2014

(65) Prior Publication Data
US 2014/0304438 A1  Oct. 9, 2014

(30) Foreign Application Priority Data

Apr. 9, 2013  (CN) .................. 2013 1 01203583

(51) Int. Cl.
*G06F 5/00*  (2006.01)
*G06F 11/30*  (2006.01)
*G06F 3/06*  (2006.01)

(52) U.S. Cl.
CPC ...... *G06F 11/3051* (2013.01); *G06F 2201/875* (2013.01); *G06F 2213/3854* (2013.01)
USPC ............ 710/19; 710/2; 710/5; 710/8; 710/11; 710/18

(58) Field of Classification Search
None
See application file for complete search history.

(56) References Cited

U.S. PATENT DOCUMENTS

2002/0135457 A1*  9/2002  Sandbach et al. ............... 338/47
2013/0162452 A1*  6/2013  Wang ............................ 341/22

* cited by examiner

*Primary Examiner* — Scott Sun
(74) *Attorney, Agent, or Firm* — Novak Druce Connolly Bove + Quigg LLP

(57) ABSTRACT

Method for detecting presses on buttons of an electronic device with a reduced number of General Purpose In/Out (GPI/O) ports includes a number of the GPI/O ports The number of the buttons is greater than the number of the GPI/O ports. A proportion of the buttons are each coupled between one of the I/O ports and ground, and the remaining proportion of the buttons are each coupled between any two of the I/O ports. The GPI/O ports are set to work in a first working state or in a second state to provide a first signal or second signal respectively. When a signal provided by a GPI/O port working at the first working mode changes, the method determines which one of the buttons has been pressed.

12 Claims, 4 Drawing Sheets

DETECTION SYSTEM FOR DETECTING BUTTON BEING PRESSED AND METHOD THEREOF

FIELD

The present disclosure relates to an electronic device with a number of buttons, and particularly to a button detection system applied in the electronic device and a button detection method for detecting a press on a button of the electronic device.

BACKGROUND

Buttons are found in electronic devices, each button of the electronic device is coupled to a general purpose input output (GPIO) port of a component (e.g., a processor) of the electronic device. Thus, the electronic device can determine whether the button is pressed according to a pulse signal output from the GPIO.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
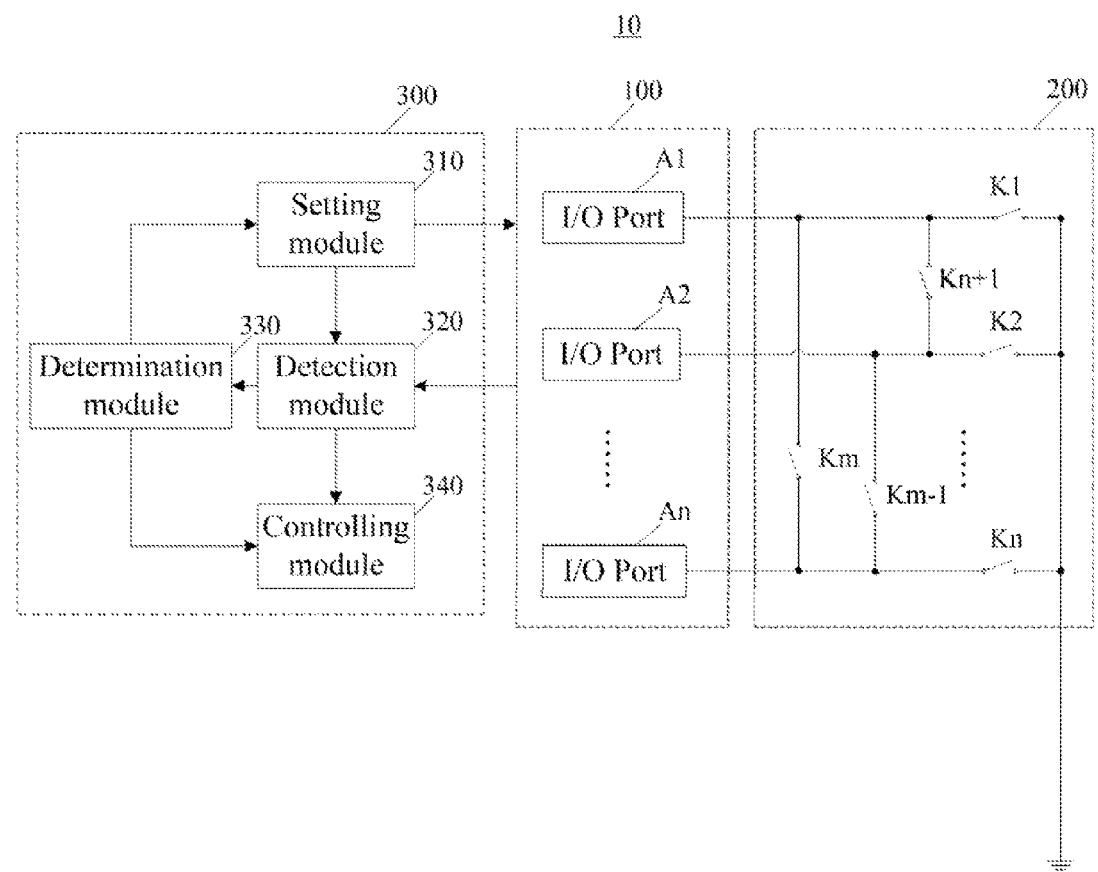
FIG. 1 is a block diagram of a detection system applied in an electronic device according to one embodiment.

FIG. 1 illustrates an embodiment of a button detection system 10. The button detection system 10 can applied in an electronic device (not labeled) having a number of buttons, for any press applied to the buttons of the electronic device. The button detection system 10 includes an Input/Output (I/O) port unit 100, a button unit 200, and a processing unit 300.

The I/O port unit 100 is coupled between the button unit 200 and the processing unit 300, the I/O port unit 100 includes a number of I/O ports A1~An. In the following disclosure the term "coupled" is defined as connected, whether directly or indirectly through intervening components, and is not necessarily limited to physical connections. The connection can be such that the objects are permanently connected or releasably connected. Each I/O port includes a first working mode and a second working mode, and provides a first signal or a second signal at each of the first and second working modes respectively. The first signal and the second signal are logical reverse of each other. When the I/O port is in the first working mode, it is only used for receiving external input signals. When the I/O port is in the second working mode, the I/O port is used for outputting data to external devices or components. In this embodiment, each of the I/O ports is a general purpose Input/Output port (GPIO), the number of the I/O ports is greater than two, the first signal can be a logic-high signal, and the second signal can be a logic-low signal.

The button unit 200 includes a number of buttons K1~Km. In this embodiment, the number of the I/O ports and the number of the buttons satisfy a equation of: $m=n+[n\times(n-1)/2]$, wherein n represents the number of I/O ports, and m represents the number of the buttons. The number of the buttons is greater than the number of the I/O ports. A number of the buttons are each coupled between one of the I/O ports and a ground, and the remaining buttons are each coupled between any two of the I/O ports. Thus, each button is coupled to at least one of the I/O ports, and one or more of the I/O ports are coupled to at least two buttons.

The processing unit 300 includes a setting module 310, a detecting module 320, a determination module 330, and a controlling module 340.

The setting module 310 sets each of the number of I/O ports to work at the first working mode to provide the first signal at a first original state, and generate a first detection signal.

The detection module 320 detects whether the signal provided by an I/O port is changed or not compared to the first original state, in response to the first detection signal. When the signal provided by the I/O port is changed compared to the first original state, the detection module 320 determines that one of the buttons coupled between the I/O port and the ground is pressed and generates a signal according to the button which is pressed. When the signal provided by each of the I/O ports A1~An does not change compared to the first original state, the detection module 320 generates a setting signal.

The setting module 310 further sets one of the I/O ports A1~An to work at the second working mode to provide the second signal at a second original state according to the setting signal, and sets the others I/O ports to work at the first working mode to provide the first signal, and generates a second detection signal.

The detection module 320 detects whether the signal provided by one of the I/O ports working at the first working mode is changed or not compared to the first original state, according to the second detection signal. When the signal provided by one of the I/O ports working at the first working mode is changed compared to the first original state, the detection module 320 determines that one of the buttons coupled between the one of the I/O ports and the I/O port which is set to work at the second working mode is pressed and generates a signal according to the button which has been pressed. When the signal provided by each of the I/O ports which are set to work at the first working mode does not change, the detection module 320 counts the number of I/O ports set to work at the second working mode.

The determining module 330 determines whether the number of the I/O ports set to work at the second working mode is equal to the total number of the I/O ports minus one. When the number of I/O ports set to work at the second working mode is not equal to the total number of the I/O ports minus one, the determining module 330 generates the setting signal for setting a next I/O port to work at the second working mode and sets the remaining I/O ports to work at the first working mode. When the number of I/O ports set to work at the second working mode is equal to the total number of the I/O ports minus one, the detection of all of the buttons is finished.

The controlling module 340 controls the electronic device to perform an operation associated with the button which is pressed in response to the signal of being pressed.

Figure 2:
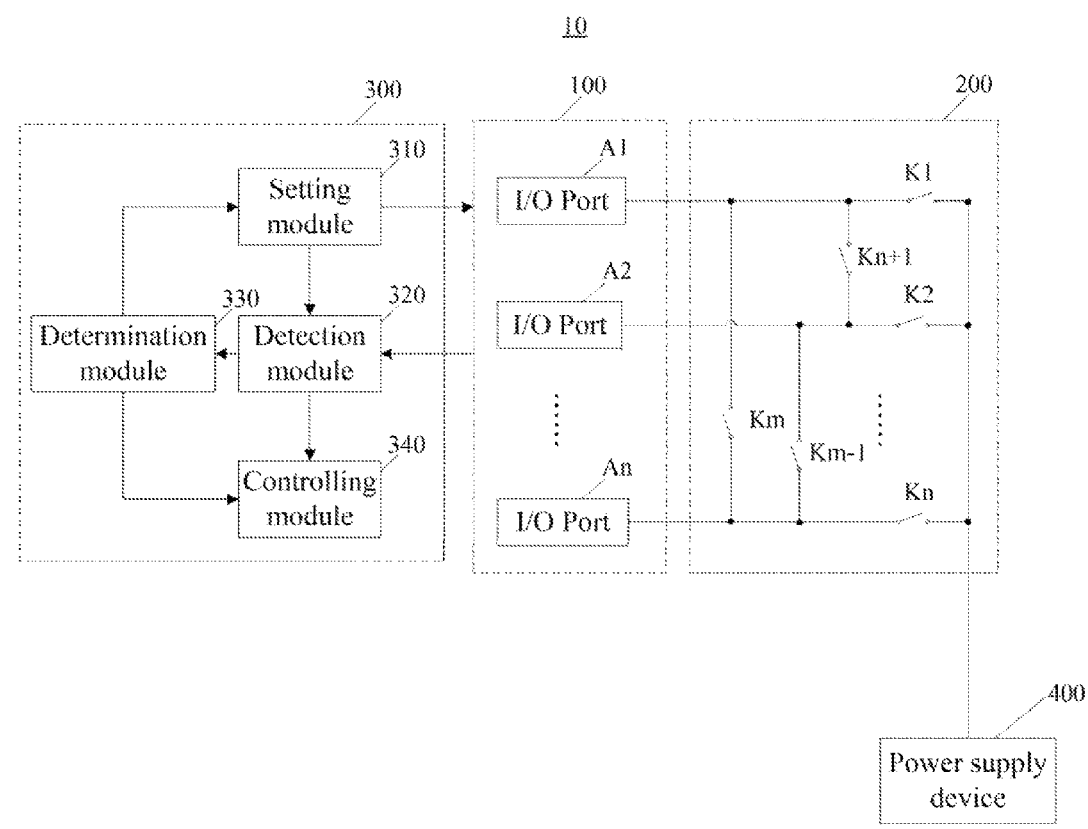
FIG. 2 is a block diagram of a detection system applied in an electronic device according to another embodiment.

FIG. 2 shows another embodiment in which the detection system 10 includes a power supply device 400. The power supply device 400 is coupled to the button unit 200. In this embodiment, the first signal can be a logic-low signal, and the second can be a logic-high signal.

Figure 3:
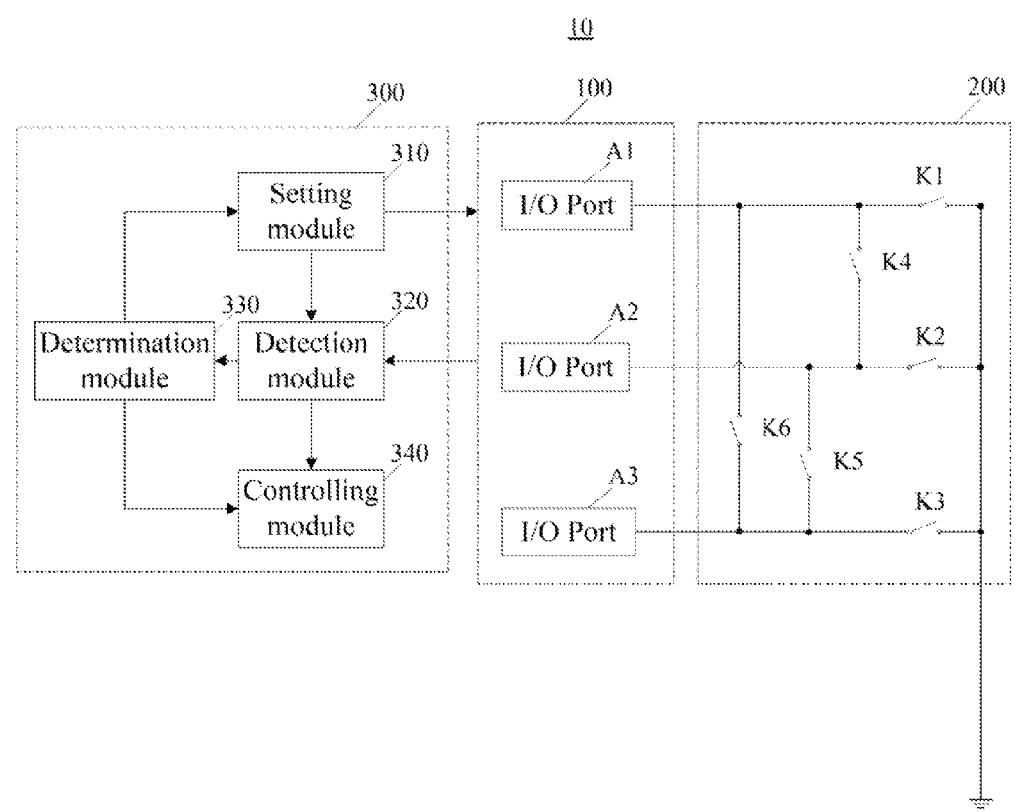
FIG. 3 is a block diagram of one example of a detection system which includes three I/O ports.

FIG. 3 shows an embodiment which includes three I/O ports and six buttons. Each of the buttons K1~K3 is coupled between one of the I/O ports and the ground. Each of the buttons K4~K6 is coupled between two of the three I/O ports.

The setting module 310 first sets each of the I/O ports A1~A3 to work at the first working mode to provide the first signal at the first original state, and generates the first detection signal. The detection module 320 detects when the signal provided by an I/O port is changed compared to the first original state, according to the first detection signal. For example, when the button K2 is pressed, the signal provided by the I/O port A2 is changed to a logic-low signal from a logic-high signal compared to the first original state, and the change of the signal is detected by the detection module 320. Then, the detection module 320 determines that button K2 is pressed and generates the signal accordingly. The controlling module 340 controls the electronic device to perform an operation corresponding to the button K2 in response to the signal of being pressed.

When the signal provided by each of the I/O ports A1~A3 does not change compared to the first original state, the detection module 320 generates the setting signal. The setting module 310 first sets the I/O ports A1 to work at the second working mode to provide the second signal at the second original state, and sets the I/O ports A2 and A3 to work at the first working mode to provide the first signal at the first original state, according to the setting signal. Upon this condition, in one example, if the button K4 coupled between the I/O port A1 and the I/O port A2 is pressed, the detection module 320 detects that the signal provided by the I/O port A2 is changed to a logic-low signal from a logic-high signal compared to the first original state. Thus, a signal of button K4 being pressed is generated to control the electronic device to perform a corresponding operation. When the signal provided by each of the I/O ports A1-A3 does not change, the setting module 310 further sets the next I/O port A2 to work at the second working mode to provide the second signal and sets the I/O ports A1 and A3 to work at the first working mode to provide the second signal, and the detection module 320 counts how many I/O ports have been set to work at the second working mode. Then, detection of any presses applied to the buttons is performed again under this condition. The determining module 330 determines whether the number of I/O ports which have been set to work at the second working mode is equal to the number of the I/O ports minus one. When the number of I/O ports set to work at the second working mode is equal to two, the detection of all of the buttons is finished.

Figure 4:
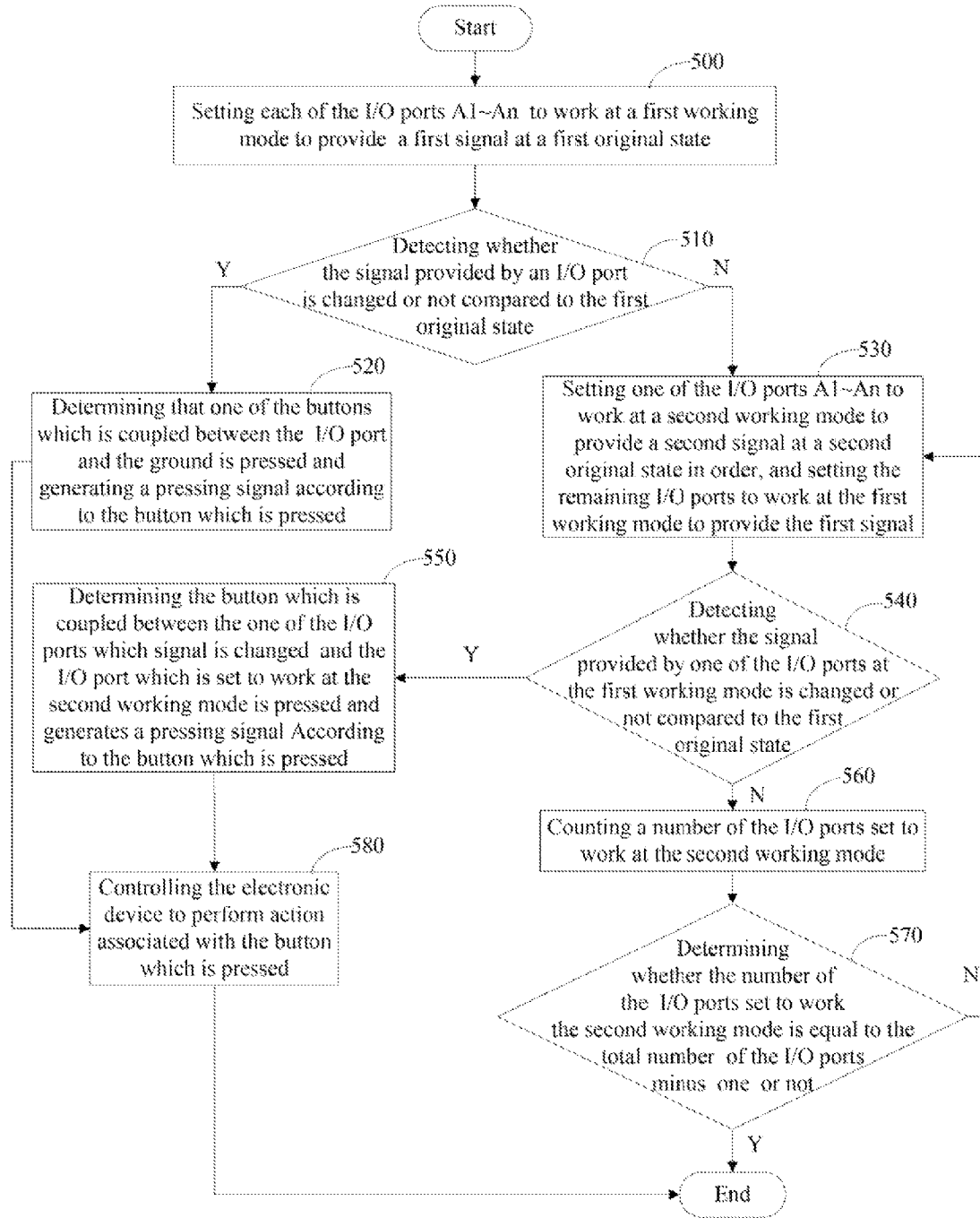
FIG. 4 is a flowchart of a detection method implemented by the detection system.

FIG. 4 shows a detection method for detecting presses applied to the buttons of the electronic device. Depending on the embodiment, additional steps can be added, others removed, and the ordering of the steps can be changed.

In 500, the setting module 310 sets each of the I/O ports A1~An to work at a first working mode to provide a first signal at a first original state.

In 510, the detection module 320 detects whether the signal provided by an I/O port is changed or not compared to the first original state. When the signal provided by the I/O port changes compared to the first original state, 520 is implemented. When the signal provided by each of the I/O ports A1~An is not changed, 530 is implemented.

In 520, the detection module 320 determines that one of buttons which is coupled between the I/O port and the ground is pressed and generates a signal accordingly and 580 is implemented.

In 530, the setting module 310 sets one of the I/O port A1~An to work at a second working mode to provide a second signal at a second original state, and sets the other I/O ports to work at the first working mode to provide the first signal.

In 540, the detection module 320 detects whether the signal provided by one of the I/O ports working at the first working mode changes compared to the first original state. When the signal provided by one of the I/O ports working at the first working mode changes compared to the first original state, 550 is implemented. When the signal provided by each of the I/O ports working at the first working mode is not changed compared to the first original state, 560 is implemented.

In 550, the detection module 320 determines which one of the buttons coupled between the one of the I/O ports with a changed signal and the I/O port which is set to work at the second working mode has been pressed and generates a signal accordingly, then 580 is implemented.

In 560, the detection module 320 counts how many I/O ports have been set to work at the second working mode.

In 570, the determining module 330 determines whether the number of the I/O ports which have been set to work at the second working mode is equal to the total number of the I/O ports minus one. When the number of the I/O ports which have been set to work at the second working mode is equal to the total number of the I/O ports minus one, the detection of all of the buttons is finished and the procedure is ended. When the number of I/O ports which have been set to work at the second working mode is not equal to the number of the I/O ports minus one, the process returns to 530.

In 580, the controlling module 340 controls the electronic device to perform the operation associated with a pressed button.

Although information and the advantages of the present embodiments have been set forth in the foregoing description, together with details of the structures and functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A detection system for detecting pressing operation to button applied in an electronic device, comprising:
   an input/output (I/O) port unit comprising a plurality of I/O ports, each of the I/O ports comprising a first working mode and a second working mode, each of the I/O ports configured to provide a first signal or a second signal at each of the first and second working modes;
   a button unit comprising a plurality of buttons, each button is coupled to at least one of the I/O ports, wherein a number of the buttons is greater than a number of the I/O ports;
   a processing unit comprising a setting module for setting each I/O port to work at the first working mode or the second working mode to provide the first signal or the second signal at an original state, a detection module for detecting whether a signal provided by each I/O port is changed or not compared to the original state and determining which button is pressed if the signal provided by one of the I/O ports is changed, and a controlling module for controlling the electronic device to perform an operation associated with the pressed button.

2. The detection system as claimed in claim 1, wherein the number of the I/O ports and the number of the buttons satisfy a equation of: $m=n+[n\times(n-1)/2]$, wherein n represents the number of I/O ports, m represents the number of buttons, a portion of the buttons are each coupled between one of the I/O ports and a ground, and the remaining buttons are each coupled between any two of the I/O ports.

3. The detection system as claimed in claim 2, wherein the setting module sets each of the plurality of I/O ports to work at the first working mode to provide the first signal at a first original state; if the signal provided by an I/O port is changed compared to the first original state, the detection module determines that one of the buttons coupled between the I/O port and the ground is pressed.

4. The detection system as claimed in claim 3, wherein if the signal provided by each of the I/O ports is not changed compared to the first original state, the setting module further sets one of the I/O ports to work at the second working mode to provide the second signal at a second original state in order, and sets the other I/O ports to work at the first working mode to provide the first signal; if the signal provided by one of the I/O ports which is set to work at the first working mode is changed compared to the first original state, the detection module determining that one of the buttons coupled between the one of the I/O ports and the I/O port which is set to work at the second working mode is pressed.

5. The detection system as claimed in claim 4, further comprising a determining module, wherein the detection module counts a number of I/O ports set to work at the second working mode if the signal provided by each of the I/O ports at the first working mode is not changed, and the determining module determines whether the number of I/O ports set to work at the second working mode is equal to the total number of the I/O ports minus one; if the number of the I/O ports set to work at the second working mode is not equal to the total number of the I/O ports minus one, the setting module setting a next I/O port to work at the second working mode, and setting the remaining I/O ports to work at the first working mode.

6. The detection system as claimed in claim 1, wherein the first signal is a logic-high level signal or a logic-low level signal, and the first signal and the second signal are logical reverse to each other.

7. A detection method for detecting pressing operation applied to buttons of an electronic device having a plurality of I/O ports, the detection method comprising:
  connecting each of the I/O ports to at last one of the buttons, wherein each of the I/O ports comprising a first working mode and a second working mode to provide a first signal or a second signal at each of the first and second working modes, and a number of the buttons is greater than a number of the I/O ports;
  setting each I/O port to work at the first working mode or the second working mode to provide the first signal or the second signal at an original state;
  detecting whether a signal provided by each I/O port is changed or not compared to the original state;
  determining which button is pressed if the signal provided by one of the I/O ports is changed; and
  controlling the electronic device to perform an operation associated with the pressed button.

8. The detection method as claimed in claim 7, wherein the number of the I/O ports and the number of the buttons satisfy a equation of: $m=n+[n\times(n-1)/2]$, wherein n represents the number of I/O ports, m represents the number of buttons, a portion of the buttons are each coupled between one of the I/O ports and a ground, and the remaining buttons are each coupled between any two of the I/O ports.

9. The detection method as claimed in claim 8, wherein the step of setting each I/O port to work at the first working mode or the second working mode comprises: setting each of the plurality of I/O ports to work at the first working mode to provide the first signal at a first original state; and the step of determining which button is pressed comprises: determining that one of the buttons coupled between an I/O port and the ground is pressed if the signal provided by the I/O port is changed compared to the first original state.

10. The detection method as claimed in claim 9, wherein the step of setting each I/O port to work at the first working mode or the second further comprises: setting one of the I/O ports to work at the second working mode to provide the second signal at a second original state in order, and setting the other I/O ports to work at the first working mode to provide the first signal, if the signal provided by each of the I/O ports is not changed compared to the first original state; and the step of determining which button is pressed further comprises: determining whether one of the I/O ports which is set to work at the first working mode is changed compared to the first original state; and determining that one of the buttons coupled between the one of the I/O ports which signal is changed and the one of the I/O ports which is set to work at the second working mode is pressed, if the signal provided by one of the I/O ports which is set to work at the first working mode is changed compared to the first original state.

11. The detection method as claimed in claim 10, further comprising:
  counting a number of the I/O ports set to work at the second working mode if the signal provided by each of the I/O ports working at the first working mode is not changed compared to the first original state;
  determining whether the number of the I/O ports set to work at the second working mode is equal to the total number of the I/O ports minus one; and
  setting a next I/O port to work at the second working mode and setting the remaining I/O ports to work at the first working mode if the number of the I/O ports set to work at the second working mode is equal to the total number of the I/O ports minus one.

12. The detection method as claimed in claim 7, wherein the first signal is a logic-high level signal or a logic-low level signal, and the first signal and the second are logical reverse to each other.

* * * * *